(12) United States Patent
Stupak et al.

(10) Patent No.: US 11,630,741 B2
(45) Date of Patent: Apr. 18, 2023

(54) SYSTEM AND METHOD FOR BACKING UP DATA IN A LOAD-BALANCED CLUSTERED ENVIRONMENT

(71) Applicant: Acronis International GmbH, Schaffhausen (CH)

(72) Inventors: Anatoly Stupak, Moscow (RU);
Dmitry Kogtev, Moscow (RU);
Serguei Beloussov, Costa del Sol (SG);
Stanislav Protasov, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 23 days.

(21) Appl. No.: 17/487,449

(22) Filed: Sep. 28, 2021

(65) Prior Publication Data

US 2022/0043720 A1 Feb. 10, 2022

Related U.S. Application Data

(63) Continuation of application No. 16/589,188, filed on Oct. 1, 2019, now Pat. No. 11,210,177.
(Continued)

(51) Int. Cl.
*G06F 11/14* (2006.01)
*G06F 11/20* (2006.01)
*G06F 16/11* (2019.01)

(52) U.S. Cl.
CPC ...... *G06F 11/1464* (2013.01); *G06F 11/1451* (2013.01); *G06F 11/203* (2013.01); *G06F 16/119* (2019.01); *G06F 2201/82* (2013.01); *G06F 2201/84* (2013.01); *Y10S 707/99955* (2013.01)

(58) Field of Classification Search
CPC ............ G06F 11/1464; G06F 11/1451; G06F 11/203; G06F 16/119; G06F 2201/82; G06F 2201/84; G06F 11/1448; G06F 11/1446; G06F 11/1458; G06F 11/2046; Y10S 707/99955; H04L 67/1095
See application file for complete search history.

(56) References Cited

U.S. PATENT DOCUMENTS 7,934,064 B1 * 4/2011 Per .................. G06F 11/1451
711/161
9,904,721 B1 * 2/2018 Holenstein ............ G06F 16/273
(Continued)

FOREIGN PATENT DOCUMENTS

CN 108255647 * 7/2018 .......... G06F 11/1448

*Primary Examiner* — Gabriel Chu
(74) *Attorney, Agent, or Firm* — ArentFox Schiff LLP; Michael Fainberg

(57) ABSTRACT

Disclosed herein are systems and method for backing up data in a load-balanced clustered environment. A clustered resource to be backed up is selected, wherein the clustered resource is stored on a common storage system and operated on by a cluster-aware application executing on at least a first node and a second node of a computing cluster. A load-balanced application may migrate the clustered resource from the first node with a high-load consumption to the second node with low-load consumption. A list of changes made by both nodes are received and merged. A backup agent then generates a consistent incremental backup using data retrieved from the common storage system according to the merged list of changes to the clustered resource.

20 Claims, 6 Drawing Sheets

Related U.S. Application Data

(60) Provisional application No. 62/740,016, filed on Oct. 2, 2018.

(56) References Cited

U.S. PATENT DOCUMENTS

| | | | |
|---|---|---|---|
| 9,998,537 B1* | 6/2018 | O'Connell | G06F 11/1451 |
| 10,353,780 B1* | 7/2019 | O'Connell | G06F 11/1451 |
| 2005/0021524 A1* | 1/2005 | Oliver | G06F 11/1448 |
| 2009/0240904 A1* | 9/2009 | Austruy | G06F 11/1662 |
| | | | 711/162 |
| 2016/0092256 A1* | 3/2016 | Jayachandran | G06F 9/45558 |
| | | | 718/1 |
| 2017/0109087 A1* | 4/2017 | Dornemann | G06F 3/067 |
| 2019/0179711 A1* | 6/2019 | Luo | G06F 11/1464 |

* cited by examiner

Windows Server 2012R2
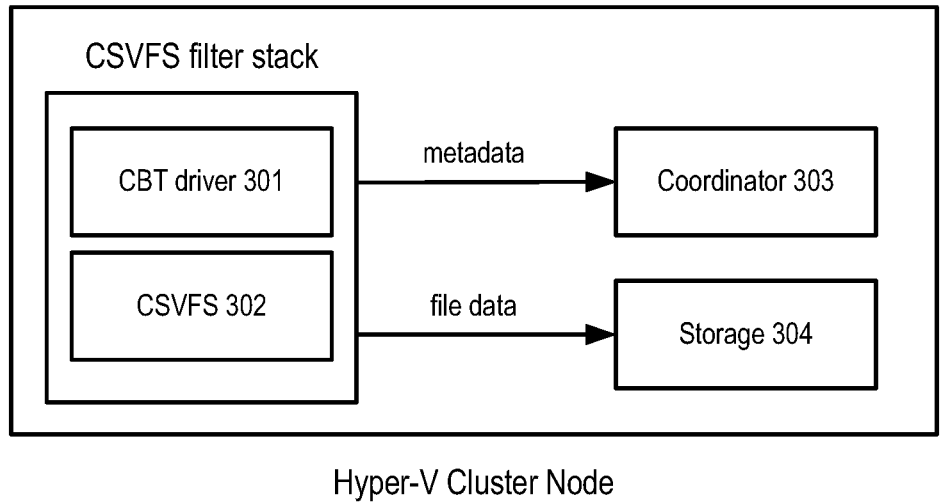
Hyper-V Cluster Node
Windows Server 2008R2
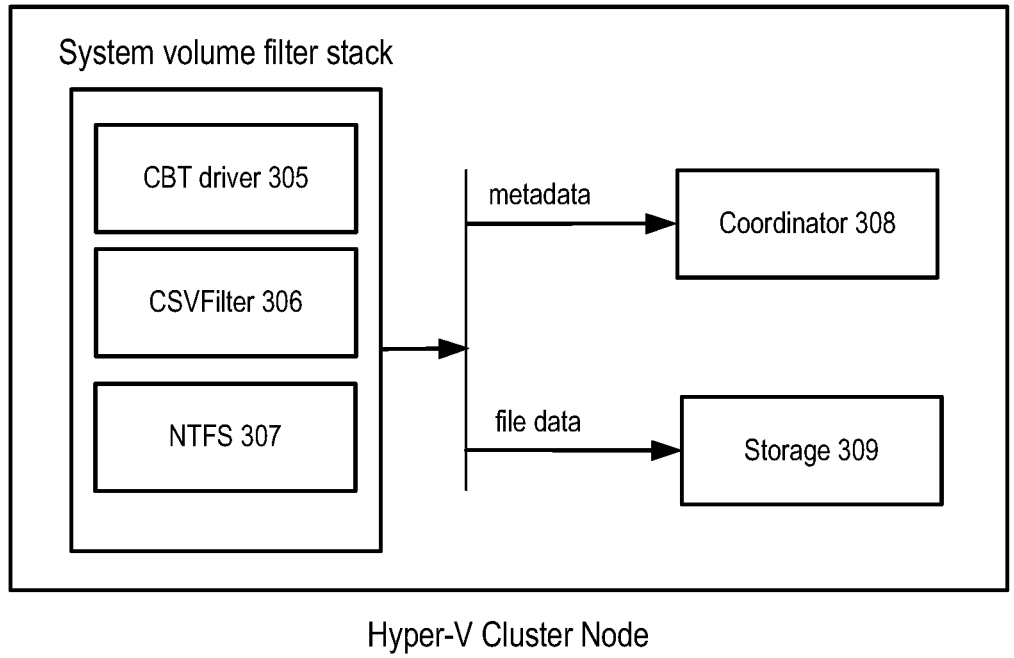
Hyper-V Cluster Node
Fig. 3

SYSTEM AND METHOD FOR BACKING UP DATA IN A LOAD-BALANCED CLUSTERED ENVIRONMENT

CROSS-REFERENCE TO RELATED APPLICATIONS

This application is a continuation of U.S. Non-Provisional application Ser. No. 16/589,188 filed on Oct. 1, 2019, and claims the benefit of U.S. Provisional Application No. 62/740,016 filed on Oct. 2, 2018, both which are hereby incorporated in their entirety, herein.

FIELD OF TECHNOLOGY

The present disclosure relates generally to the field of data backup, more specifically, to systems and methods of backing up data in a cluster storage environment.

BACKGROUND

Currently, there are a number of conventional methods that relate to organization of data archiving. One of these is a backup of the entire hard drive, which typically involves copying of the hard drive content onto some other medium, such as another hard disk drive, a DVD ROM, a DVD RAM, a flash disk, etc. The primary disadvantage of such a method is the need to backup what is frequently a very large amount of data, which, on the one hand, results in a relatively lengthy process of archiving, and, on the other hand, frequently requires relatively large available space for the archived data. This ultimately results in a relatively high cost of archiving per unit of archived data.

Another approach is often referred to as "incremental backup," which generally decreases the amount of space required for the archiving. With the incremental backup, typically the contents of the hard disk drive is archived, or stored somewhere once. After that, only that data that has been changed, or added, since the previous backup, or since the previous incremental backup, is actually archived. Recovery of data from the archive typically involves merging of the original backup and the various incremental backups. There are generally two conventional approaches to implementing the incremental backup. One approach is to archive data in the form of logical structures, such as files. The second approach is to preserve the physical structures as they are represented on a storage medium. In other words, in the second case, sectors, clusters, and other physical data blocks are archived.

One approach for creating incremental backups of a data storage system uses what is referred to as changed block tracking (CBT) technology. Changed block tracking technology tags blocks of a logical volume that have changed since a declared checkpoint (e.g., a prior backup), and enables other applications to copy those tagged, changed blocks, such as when making an incremental backup. Changed block tracking technology can be implemented within a storage or I/O processing stack of a system (e.g., via a file system filter driver).

Increasingly, enterprise-level software applications are being executed in clustered environments, in which multiple computing devices work together in a coordinated manner. For example, in order to provide failover and load balancing functionality, several computing devices (i.e., cluster nodes) can be linked to one logical entity (i.e., cluster) with a common shared storage to store data of cluster-aware applications. However, using known approaches for data backup, it is a serious problem to perform fast and consistent incremental backup of data of cluster-aware applications stored in such common shared storage (also herein referred to cluster storage). Data changes in the case of a cluster-aware application can occur on any node, however, current changed block tracking technology is limited to tracking the changes for one single node. For example, the same data can be changed on several different nodes (e.g., virtual machines) executing a database server or a mail server, but a conventional backup application is unaware of these multiple changes. As a result, a fast incremental backup which uses changed block tracking technology is unable to be performed for clusters, as the backup could be inconsistent or corrupted. An alternative approach of performing an incremental backup without changed block tracking, which would require processing of all the data files which were backed up and finding all the changes, would be infeasible because it would take a very long time for large clustered storages (i.e., on the order of several weeks).

SUMMARY

Accordingly, aspects of the present disclosure provide an improved system for supporting changed block tracking on such systems with cluster-aware application using a common shared storage. That is, aspects provide for an optimized architecture for changed block tracking on clustered environments.

In one exemplary aspect for backing up data in a clustered environment, a clustered resource to be backed up is selected, wherein the clustered resource is stored on a common storage system and operated on by a cluster-aware application executing on two or more nodes of a computing cluster. A first backup agent executing on a first node of the computing cluster may determine a list of changes to the clustered resource that are tracked by the first node and that are requested by a first instance of the cluster-aware application executing on the first node. The first backup agent may receive at least one list of changes to the clustered resource that are tracked by peer backup agents executing on other nodes of the computing cluster and that were requested by peer instances of the cluster-aware application executing on the other nodes. The first backup agent may merge the lists of changes to the clustered resource, and may generate a consistent incremental backup using data retrieved from the common storage system according to the merged lists of changes to the clustered resource.

In one aspect, the common storage system is managed using a clustered file system configured to provide concurrent access to multiple nodes of the computing cluster.

In one aspect, the first backup agent determines the list of changes to the clustered resource that are tracked by the first node by intercepting one or more file modification operations from the first instance of the cluster-aware application to the common storage system for changing data of the clustered resource.

In one aspect, the cluster-aware application comprises a load-balanced application configured to automatically migrate the clustered resource from higher-loaded nodes to lower-loaded nodes of the computing cluster, and the first backup agent determines a set of nodes of the computing cluster in which the clustered resource appeared, and collects the lists of changes from the determined set of nodes.

In one aspect, the cluster-aware application comprises a failover application configured to automatically migrate the clustered resource from a second node determined to be unavailable.

In one aspect, responsive to determining that the second node is unavailable, the first backup agent may declare that a list of changed block data from the second node is lost and the consistent incremental backup is generated further based on a recalculated difference between a previous application-consistent snapshot of the clustered resource.

In one aspect, the first backup agent may save file modification information to the common storage system synchronously on each file modification operation. The first backup agent may further load (i) positions of changed parts of the clustered resource and (ii) metadata from common storage, and may merge the loaded positions and metadata with currently tracked changes, wherein the consistent incremental backup is generated further based on the merged loaded positions, metadata, and currently tracked changes.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 3 is a block diagram illustrating implementations of the interceptor of FIG. 1 in greater detail.

DETAILED DESCRIPTION

Exemplary aspects are described herein in the context of a system, method, and computer program product for backing up data in a cluster-based storage system. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
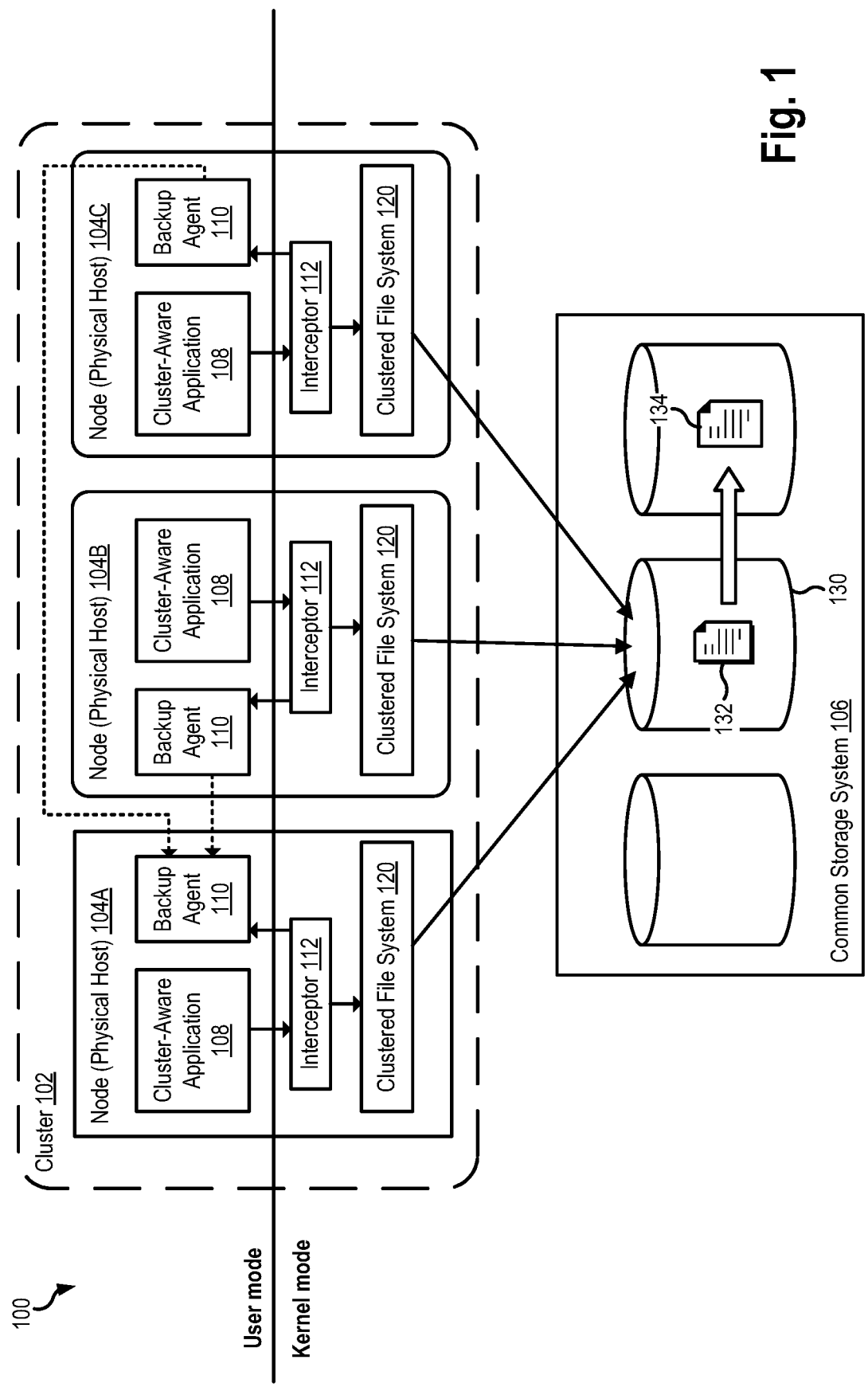
FIG. 1 is a block diagram illustrating a system for backing up data in a clustered environment according to an exemplary aspect.

FIG. 1 is a block diagram illustrating a system 100 for backing up data in a clustered environment, according to an exemplary aspect. The system 100 includes a cluster 102 of computing nodes 104A, 104B, 104C (collectively referred to as nodes 104) that are communicatively connected to a common storage system 106. As shown in FIG. 1, the nodes 104 may include one or more physical servers. In some aspects, the nodes 104 may include one or more virtual machines that are executing on other physical servers. In some aspects, the nodes 104 may include any combination of physical servers and virtual machines. The nodes 104 that are linked in a same cluster 102 define a set of entities that coordinate to support execution of a cluster-aware software application or one or more features of a software application. The nodes 104 may be centrally controlled by a managing application or organized in a decentralized manner.

The common storage system 106 includes one or more storage devices that are communicatively connected to two or more computing devices in the cluster 102. The common storage system 106 is managed via a clustered file system 120 (also referred to as a distributed access file system) that provides concurrent access of data in the common storage system to multiple nodes 104 of the cluster 102, in contrast to traditional file systems which typically require that a particular logical volume is "owned" by a single computing device at a given time. In an aspect, the common storage system 106 includes a shared disk containing a logical volume (referred to herein as a cluster storage volume 130) that is made accessible for read and write operations by all nodes 104 within the cluster 102.

The system 100 further includes a cluster-aware application 108 that is executing on two or more nodes 104 of the cluster 102 and storing files and other data (i.e., clustered resource 132) in the common storage system 106. Each node 104 is depicted in FIG. 1 executing a separate instance of the cluster-aware application 108. In some aspects, the cluster-aware application 108 may be a virtual machine monitor or virtual machine management system configured to provide a failover feature that enables a virtual machine to migrate its execution to a different node in the cluster 102, e.g., in cases of hardware or software failure of its current node. In some aspects, the cluster-aware application 108 may be a database server (e.g., SQL Server®) configured to execute a database cluster on multiple nodes in the cluster. In some aspects, the cluster-aware application 108 may be a file server application configured to provide a scale-out feature that shares a same folder of files from multiple nodes of the same cluster.

As described herein, the cluster-aware application 108 is configured to operate with one or more clustered resources 132 that are comprised of one or more files or data objects stored on the common storage system 106. In the aspects in which the cluster-aware application is a virtual machine monitor, such clustered resources 132 are virtual hard disk files (e.g., VHD files) which represent the contents of a virtual machine's (virtual) hard disk drive. In the aspects in which the cluster-aware application is a database server, such clustered resources 132 are SQL database files. In the aspects in which the cluster-aware application is a file server application, the clustered resources 132 may be files and folders published by the file server application. It is these clustered resources 132 that traditionally have difficulties with data backups because multiple nodes in the cluster have concurrent access to such resources and are able to manipulate/modify such data.

According to an aspect, an instance of a backup agent 110 is installed on all the nodes 104 in the cluster. The backup agent 110 includes a file-level request interceptor 112 configured to intercept all of the requests going to the clustered file system 120. The intercepted requests include (1) write requests from the clustered application to modify the data contained in the clustered resources 132; and (2) metadata change requests from the clustered application to modify metadata associated with the clustered resource(s) such as name changes, size changes, permission changes, etc. The interceptor 112 is depicted in FIG. 1 as a separate module or service as the backup agent 110, but it is understood that in some implementations, the features and functionality of the interceptor may be integrated into a same module as the backup agent.

The backup agent 110 may further include a changes-aggregation module that is configured to collect and store intercepted changes related to files of tracked resources. The backup agent 110 is configured to monitor the cluster state and track the location of all resources and relations between resources and files. As described in greater detail below, the backup agent 110 is configured to generate a consistent incremental backup 134 based on the monitored cluster state and tracked location of resources and files. While the incremental backup 134 is shown being stored in the common storage system 106, it is understood that the incremental backup 134 may be moved or initially stored in a different storage system (not shown), such as a separate storage device designated for backup storage.

Figure 2:
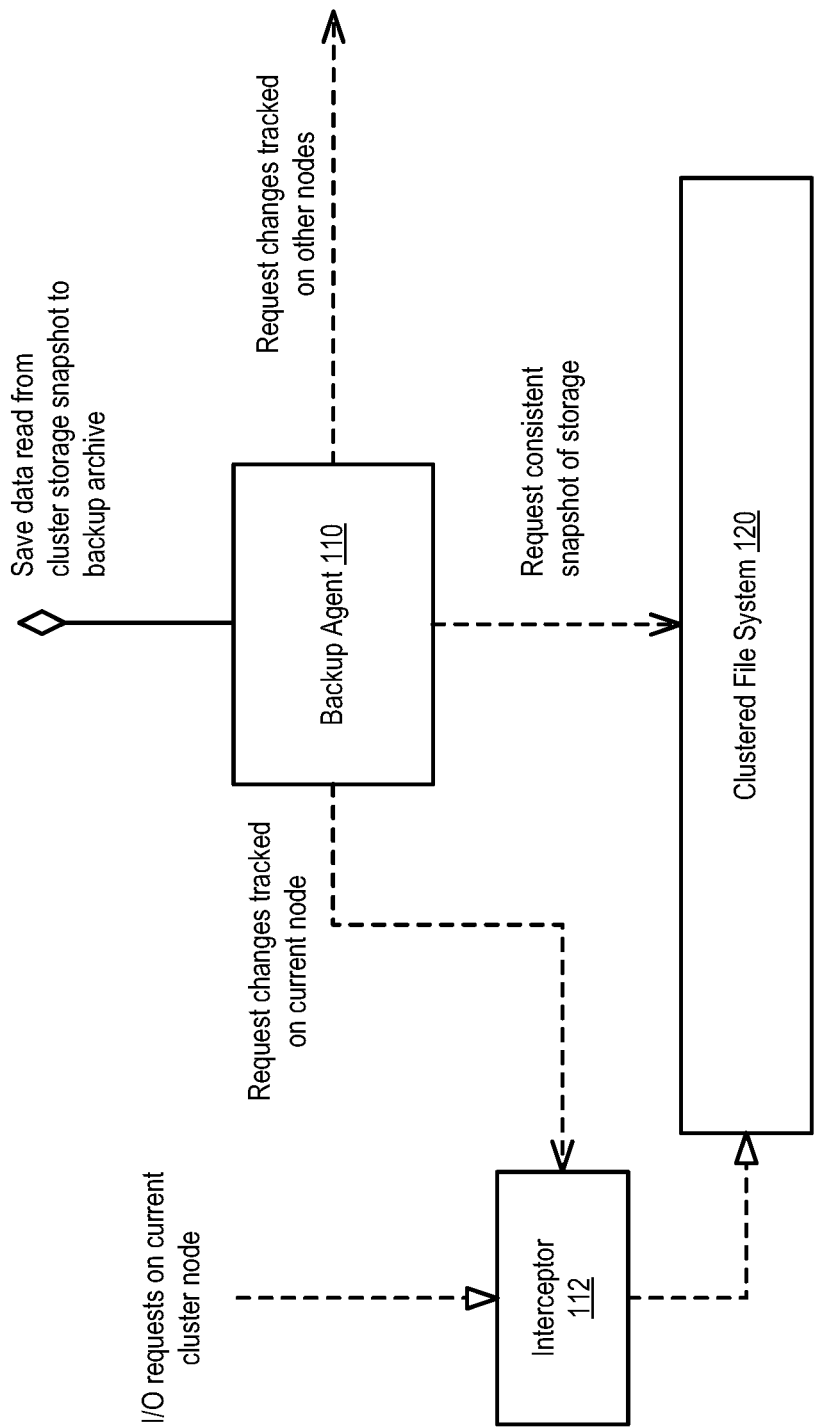
FIG. 2 is a block diagram illustrating a backup agent for creating consistent incremental backups of the cluster-based storage system of FIG. 1 in greater detail.

FIG. 2 is a block diagram illustrating a backup agent for creating consistent incremental backups of the cluster-based storage system of FIG. 1 in greater detail. As shown, the backup agent 110 defines which resources (e.g., clustered resources) are to be backed up and identifies files that are related to these resources. The backup agent 110 initiates creation of an application-consistent snapshot of the common storage containing the required files. The creation of an application-consistent snapshot involves verifying the consistency of an application before putting it into backup to ensure that the correct state of the application is put into the backup. This state may represent a common state that the nodes 104 start with before implementing any incremental backups. The backup agent 110 then requests for the collected change lists from all the nodes where the resource appeared during a given tracking period. The backup agent 110 then merges all the changed-block lists, reads and backs up the corresponding data in a consistent incremental backup.

For example, a process for merging overlapping intervals can be implemented by backup agent 110. Suppose that a file "C:\VMs\Disk1.vhdx" is changed on node 104A and node 104B. The list of changed areas for the file in node 104B may be structured as (Offset (bytes), Length (bytes)). The specific values may be (1024, 4096) and (8192, 512). This indicates changes in the intervals [1024, 5120] and [8192, 8704]. The list of changed areas for the file from node 104B may be (3072, 4096), (8704, 512) and (10240, 1024). This indicates changes in the intervals [3072, 7168], [8704, 9216] and [10240, 11264]. The overlapping intervals of the two nodes can be merged to form the intervals, [1024, 7168], [8192, 9216] and [10240, 11264]. Based on these values, backup agent 110 may determine the merged list (described in offset and length) to be (1024, 6144), (8192, 1024) and (10240, 1024).

In one example, the cluster-aware application handles a "regular" workload, in which cluster-aware application manages resources (e.g., clustered resources 132) on the nodes 104 without migrating the resource(s) from one node to another. In such cases, all changes are simply tracked and collected on corresponding nodes.

In another scenario, the cluster-aware application may be used to perform maintenance, in which all cluster resources on a given node is migrated manually or by schedule to another node and then migrated back after the maintenance is completed. In this example, a backup agent may keep a change list on the common storage system 106 or another node to allow the backup when the node will be unavailable (e.g., during a reboot).

In another scenario, the cluster-aware application may perform a load balancing operation, in which the clustered resources are automatically migrated from higher-loaded nodes (e.g., nodes having high resource consumption) to lower-loaded nodes. In this example, all changes were tracked on the nodes where the resource appeared. The backup agent then collects the tracked changes, and merges them all into one changed block list.

In another scenario, the cluster-aware application may perform a failover operation, in which resources are automatically migrated from the node which is unavailable due to software or hardware failure. In this example, two options are available for failover. Under a first option (with recovery from data loss), the backup agent detects or receives an indication that a failover is occurring on a given cluster node. The backup agent may then declare that all changed block tracking data for this cluster node is lost. To create an incremental backup despite such an occurrence, the backup agent recalculates differences in data manually on the next incremental backup. Specifically, the backup agent may use a hash-based approach to read the disk/file blocks and calculate a hash value of each block. Before writing each block to the archive, the backup agent may determine whether the hash value of the block is equal to the hash value of the same block in the archive. If the hash values are determined to be equal, the backup agent marks the block as unchanged in the archive and does not write the block data to the archive. Alternatively, if the hash values are determined to be different, the backup agent adds the new block data to the archive.

Under a second option (crash-consistent), the file interceptor saves file modification information (e.g., offsets and sizes of changed parts, metadata changes, etc.) to the common storage synchronously on each file modification operation. These changes are collected from all nodes and are not lost even when the particular node crashes (because changes are written before change actually happens.) When the resource is migrated to another node, the interceptor 112 on another node 104 continues tracking the clustered resource with taking into consideration data from the failover node. Positions of changed parts of the file are loaded from the common storage system 106 and merged with currently tracked changes. Metadata is loaded from the common storage system 106, verified (for example, to cover the case of tracking the start of a file rename operation but the rename was not completed due to node crash), and then merged with the current changes.

FIG. 3 is a block diagram 300 illustrating implementations of the interceptor 112. In one implementation, the interceptor 112 may be a filter driver installed on a clustered storage volume filter system proxy (e.g., Windows Server™ 2012+). In another implementation, the interceptor 112 may be implemented as a filter driver on a system volume upper CSVFilter (e.g., in cases of Windows Server 2008 R2). Cluster shared volumes (CSV) is a feature in Windows Server in which shared disks are concurrently accessible to all nodes within a failover cluster.

In the case of the Windows Server 2012+ implementation, the CBT driver 301 (e.g., interceptor 112) is attached to a special filter stack of the proxy file system (CSVFS 302). The CBT driver 301 is implemented as a file system mini-filter that captures all changes on the CSV coming from the current node on a file level. After processing by the CSVFS, metadata is redirected to the coordinator node 303 via a network and file data is written directly to the physical storage 304.

In the case of the Windows Server 2008 R2 implementation, the CBT driver 305 (e.g., interceptor 112) is attached to a system volume filter stack on top of CSVFilter 306. CSVFilter 306 catches all CSV-related inputs and outputs (I/O), and redirects the captured I/O to their appropriate destination (i.e., metadata is redirected to the coordinator node 308 via a network and file data is redirected to the block level storage 309). Here, the CBT driver 305 is implemented as a file system mini-filter above CSVFilter 306 and NTFS 307 that captures all changes on the CSV coming from the current node on a file level.

Figure 4:
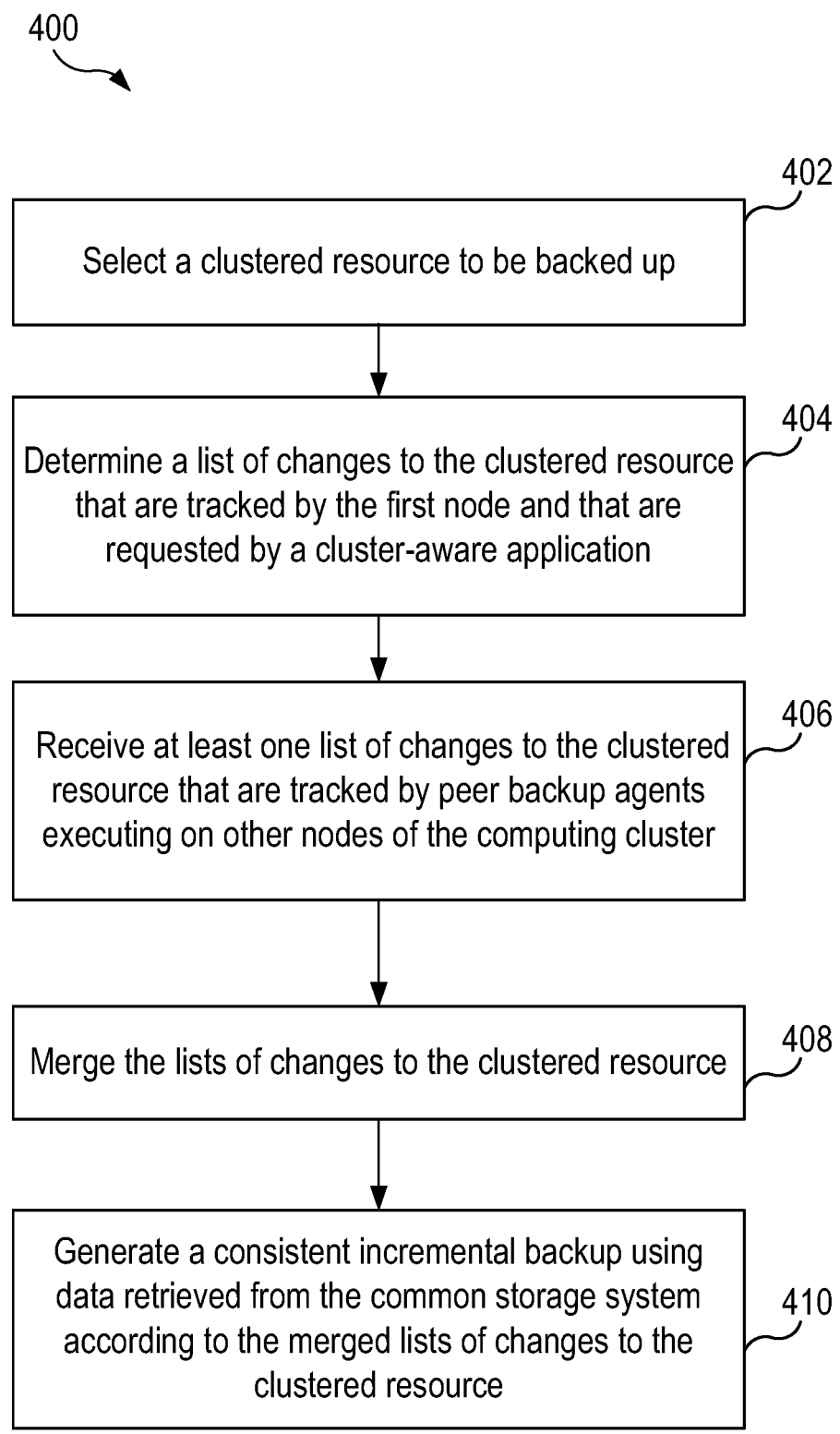
FIG. 4 is a flowchart illustrating a method for backing up data in a clustered environment according to an exemplary aspect.

FIG. 4 is a flowchart illustrating a method 400 for backing up data in a clustered environment according to an exemplary aspect. It is noted that the following description of the exemplary method makes reference to the system and components described above.

The method 400 begins at 402, in which the backup agent selects a clustered resource 132 to be backed up. The clustered resource 132 is stored on a common storage system 106 and operated on by a cluster-aware application 108 executing on two or more nodes 104 of a computing cluster 102. The common storage system is managed using a clustered file system configured to provide concurrent access to multiple nodes of the computing cluster.

At 404, the backup agent (e.g., executing on a first node of the computing cluster) determines a list of changes to the clustered resource that are tracked by the first node and that are requested by a first instance of the cluster-aware application executing on the first node. In some aspects, the backup agent intercepts one or more file modification operations from the first instance of the cluster-aware application to the common storage system for changing data of the clustered resource.

At 406, the backup agent receives at least one list of changes to the clustered resource that are tracked by peer backup agents executing on other nodes of the computing cluster and that were requested by peer instances of the cluster-aware application executing on the other nodes. In some aspects, the cluster-aware application may be a load-balanced application configured to automatically migrate the clustered resource from higher-loaded nodes to lower-loaded nodes of the computing cluster. In such cases, the backup agent may determine a set of nodes of the computing cluster in which the clustered resource appeared, and collecting the lists of changes from the determined set of nodes.

At 408, the backup agent merges the lists of changes to the clustered resource. At 410, the backup agent generates a consistent incremental backup using data retrieved from the common storage system according to the merged lists of changes to the clustered resource.

In some aspects, the cluster-aware application is a failover application configured to automatically migrate the clustered resource from a second node determined to be unavailable. In such cases, responsive to determining that the second node is unavailable, the backup agent declares that a list of changed block data from the second node is lost. The backup agent then generates the consistent incremental backup further based on a recalculated difference from a previous application-consistent snapshot of the clustered resource. In an alternative aspect, the backup agent may save file modification information to the common storage system synchronously on each file modification operation; loads (i) positions of changed parts of the clustered resource and (ii) metadata from common storage; and merges such data. The backup agent may generate the consistent incremental backup further based on the merged loaded positions, metadata, and currently tracked changes.

Figure 5:
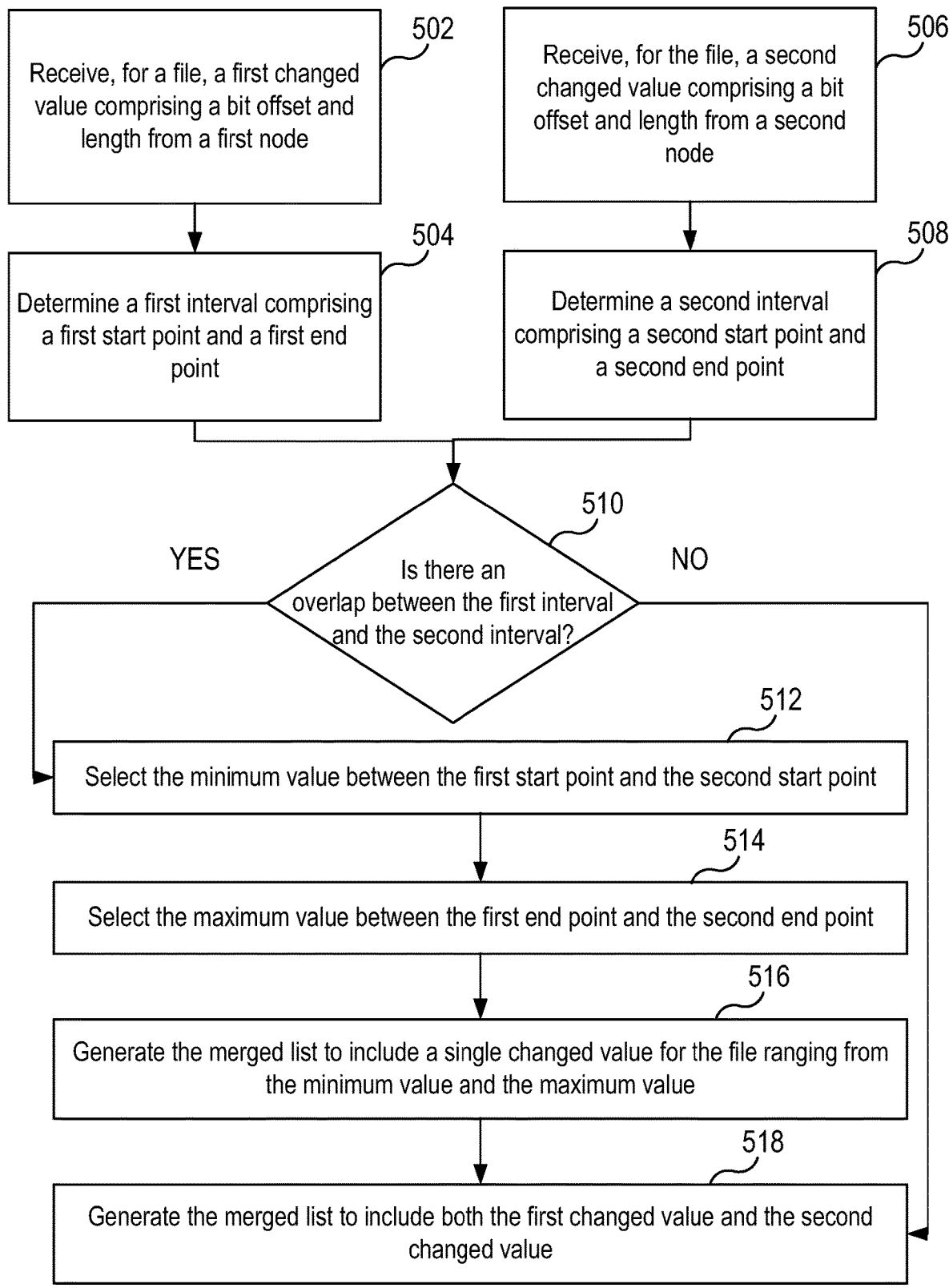
FIG. 5 is a flowchart illustrating a method for merging lists according to an exemplary aspect.

FIG. 5 is a flowchart illustrating method 500 for merging lists according to an exemplary aspect. Referring to the previous example about file "C: \VMs\Disk1.vhdx" on node 104A and node 104B, method 500 begins at 502, where backup agent 110 on node 104A receives for "C:\VMs\Disk1.vhdx," a first changed value comprising a bit offset and a length. For example, the list of changed areas for the file in node 104B may be structured as (Offset (bytes), Length (bytes)). The specific value may be (1024, 4096). At 504, backup agent 110 may determine a first interval comprising a first start point and a first end point. The offset value represents the first start point and the sum of the offset value and the length represents the first end point. Thus, backup agent determines the interval to be [1024, 5120].

At 506 and 508, the same occurs at node 104B. For example, the second changed value as received by backup agent 110 of node 104B may be (3072, 4096). Backup agent 110 may determine that the second interval is [3072, 7168].

At 510, any of the two backup agents from the respective nodes may determine whether there is an overlap between the first interval and the second interval. In this case, backup agent 110 (e.g., of node 104A) may identify an overlap between the ranges 3072 and 5120. In response to determining that an overlap exists, method 500 proceeds to 512, where backup agent 110 may select the minimum value between the first start point and the second start point (e.g., 1024). At 514, backup agent 110 may select the maximum value between the first and second end point (e.g., 7168). At 516, backup agent 110 may generate the merged list to include a single changed value for the file ranging from the minimum value and the maximum value. In this case, the range between 1024 and 7168, is represented by the single changed value (1024, 6144).

Alternatively, if at 510, backup agent 110 determines that no overlap exists, method 500 proceeds to 518, where backup agent 110 generates the merged list to include both the first changed value and the second changed value.

Figure 6:
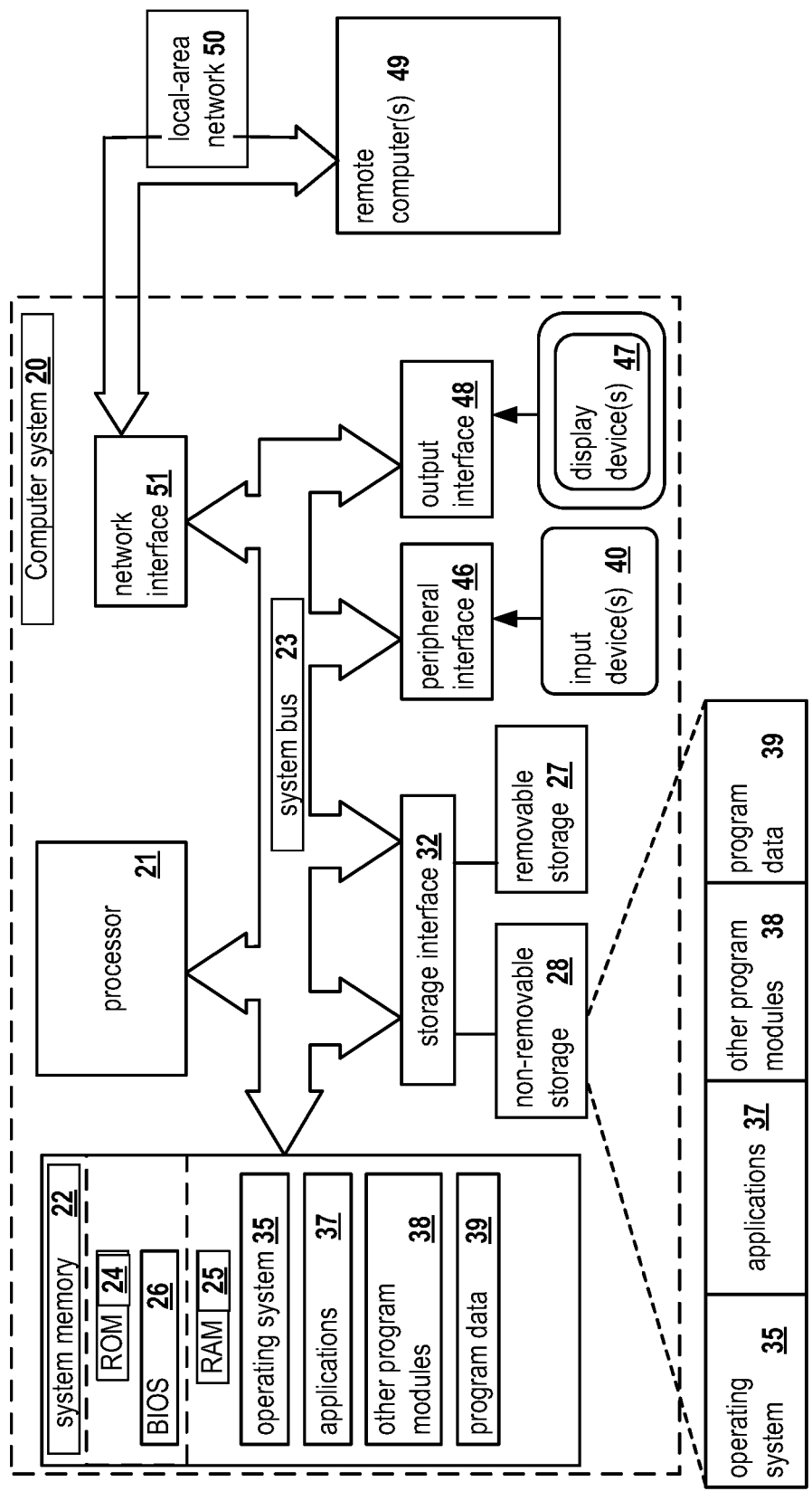
FIG. 6 is a block diagram of a computer system on which the disclosed system and method can be implemented according to an exemplary aspect.

FIG. 6 is a block diagram illustrating a computer system 20 on which aspects of systems and methods backing up data in a clustered environment may be implemented in accordance with an exemplary aspect. The computer system 20 may represent any node of nodes 104 and/or the common storage system 106, and can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of the methods described herein as performed by for example backup agent 110, cluster-aware application 108, interceptor 112, clustered file system 120, etc., may be executed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A computer-implemented method for backing up data in a clustered environment, comprising:
   selecting a clustered resource to be backed up, wherein the clustered resource is stored on a common storage system and modifiable by a cluster-aware application executing on at least a first node and a second node of a computing cluster;
   migrating, by a load-balanced application of the cluster-aware application, the clustered resource from the first node classified has having high resource consumption at a given time to the second node classified as having low resource consumption at the given time;
   determining, by a backup agent executing on the second node, a list of changes to the clustered resource requested by an instance of the cluster-aware application executing on the second node;
   receiving another list of changes to the clustered resource requested by a peer instance of the cluster-aware application executing on the first node;
   generating a merged list of changes by merging the list of changes to the another list of changes; and
   generating a consistent incremental backup using data retrieved from the common storage system according to the merged list of changes to the clustered resource.

2. The method of claim 1, wherein the computing cluster further comprises a third node, further comprising:
   determining that another peer instance of the cluster-aware application executing on the third node requested an additional list of changes to the clustered resource; and
   in response to determining that the another peer instance requested the additional list of changes, merging the additional list of changes into the merged list of changes.

3. The method of claim 1, wherein the common storage system is managed using a clustered file system configured to provide concurrent access to multiple nodes of the computing cluster.

4. The method of claim 1, wherein determining the list of changes to the clustered resource that are tracked by the second node comprises:
   intercepting, by the backup agent, one or more file modification operations from the instance of the cluster-aware application to the common storage system for changing data of the clustered resource.

5. The method of claim 1, wherein the cluster-aware application comprises a failover application configured to automatically migrate the clustered resource from a third node determined to be unavailable.

6. The method of claim 5, wherein the method further comprises:
   responsive to determining that the third node is unavailable, declaring that a list of changed block data from the third node is lost; and
   wherein the consistent incremental backup is generated further based on a recalculated difference between a previous application-consistent snapshot of the clustered resource.

7. The method of claim 5, wherein the method further comprises:
   saving file modification information to the common storage system synchronously on each file modification operation;
   loading (i) positions of changed parts of the clustered resource and (ii) metadata from common storage; and
   merging the loaded positions and metadata with currently tracked changes, wherein the consistent incremental backup is generated further based on the merged loaded positions, metadata, and currently tracked changes.

8. A system for backing up data in a clustered environment, the system comprising:
   a hardware processor configured to:
      select a clustered resource to be backed up, wherein the clustered resource is stored on a common storage system and modifiable by a cluster-aware application executing on at least a first node and a second node of a computing cluster;
      migrate, by a load-balanced application of the cluster-aware application, the clustered resource from the first node classified has having high resource consumption at a given time to the second node classified as having low resource consumption at the given time;

determine, by a backup agent executing on the second node, a list of changes to the clustered resource requested by an instance of the cluster-aware application executing on the second node;

receive another list of changes to the clustered resource requested by a peer instance of the cluster-aware application executing on the first node;

generate a merged list of changes by merging the list of changes to the another list of changes; and generate a consistent incremental backup using data retrieved from the common storage system according to the merged list of changes to the clustered resource.

9. The system of claim 8, wherein the computing cluster further comprises a third node, and wherein the hardware processor is further configured to:

determine that another peer instance of the cluster-aware application executing on the third node requested an additional list of changes to the clustered resource; and in response to determining that the another peer instance requested the additional list of changes, merge the additional list of changes into the merged list of changes.

10. The system of claim 8, wherein the common storage system is managed using a clustered file system configured to provide concurrent access to multiple nodes of the computing cluster.

11. The system of claim 8, wherein the hardware processor is configured to determine the list of changes to the clustered resource that are tracked by the second node by:

intercepting, by the backup agent, one or more file modification operations from the instance of the cluster-aware application to the common storage system for changing data of the clustered resource.

12. The system of claim 8, wherein the cluster-aware application comprises a failover application configured to automatically migrate the clustered resource from a third node determined to be unavailable.

13. The system of claim 12, wherein the hardware processor is further configured to:

responsive to determining that the third node is unavailable, declare that a list of changed block data from the third node is lost; and wherein the consistent incremental backup is generated further based on a recalculated difference between a previous application-consistent snapshot of the clustered resource.

14. The system of claim 12, wherein the hardware processor is further configured to:

save file modification information to the common storage system synchronously on each file modification operation;

load (i) positions of changed parts of the clustered resource and (ii) metadata from common storage; and merge the loaded positions and metadata with currently tracked changes, wherein the consistent incremental backup is generated further based on the merged loaded positions, metadata, and currently tracked changes.

15. A non-transitory computer readable medium storing thereon computer executable instructions for backing up data in a clustered environment, including instructions for:

selecting a clustered resource to be backed up, wherein the clustered resource is stored on a common storage system and modifiable by a cluster-aware application executing on at least a first node and a second node of a computing cluster;

migrating, by a load-balanced application of the cluster-aware application, the clustered resource from the first node classified has having high resource consumption at a given time to the second node classified as having low resource consumption at the given time;

determining, by a backup agent executing on the second node, a list of changes to the clustered resource requested by an instance of the cluster-aware application executing on the second node;

receiving another list of changes to the clustered resource requested by a peer instance of the cluster-aware application executing on the first node;

generating a merged list of changes by merging the list of changes to the another list of changes; and generating a consistent incremental backup using data retrieved from the common storage system according to the merged list of changes to the clustered resource.

16. The non-transitory computer readable medium of claim 15, wherein the computing cluster further comprises a third node, further comprising instructions for:

determining that another peer instance of the cluster-aware application executing on the third node requested an additional list of changes to the clustered resource; and in response to determining that the another peer instance requested the additional list of changes, merging the additional list of changes into the merged list of changes.

17. The non-transitory computer readable medium of claim 15, wherein the common storage system is managed using a clustered file system configured to provide concurrent access to multiple nodes of the computing cluster.

18. The non-transitory computer readable medium of claim 15, wherein an instruction for determining the list of changes to the clustered resource that are tracked by the second node comprises instructions for:

intercepting, by the backup agent, one or more file modification operations from the instance of the cluster-aware application to the common storage system for changing data of the clustered resource.

19. The non-transitory computer readable medium of claim 15, wherein the cluster-aware application comprises a failover application configured to automatically migrate the clustered resource from a third node determined to be unavailable.

20. The non-transitory computer readable medium of claim 19, further comprising instructions for:

responsive to determining that the third node is unavailable, declaring that a list of changed block data from the third node is lost; and wherein the consistent incremental backup is generated further based on a recalculated difference between a previous application-consistent snapshot of the clustered resource.

* * * * *